United States Patent [19]

Heinrich

[11] 4,164,771
[45] Aug. 14, 1979

[54] WIRELESS EMERGENCY POWER INTERRUPTING SYSTEM FOR MULTIBRANCH CIRCUITS

[75] Inventor: Theodore M. Heinrich, Murrysville Borough, Pa.

[73] Assignee: Westinghouse Electric Corp., Pittsburgh, Pa.

[21] Appl. No.: 859,075

[22] Filed: Dec. 9, 1977

[51] Int. Cl.$^2$ ............................................. H02H 3/16
[52] U.S. Cl. ......................................... 361/1; 324/51; 361/42
[58] Field of Search .......................... 361/1, 42; 324/51

[56] References Cited

U.S. PATENT DOCUMENTS

| | | | |
|---|---|---|---|
| 3,611,038 | 10/1971 | Benham | 361/45 |
| 3,698,111 | 3/1972 | Howe | 361/42 |
| 3,713,003 | 1/1973 | Benham | 361/45 |
| 3,898,557 | 8/1975 | Strock | 324/51 |
| 3,984,765 | 10/1976 | Rocci, Jr. | 324/51 |

FOREIGN PATENT DOCUMENTS

| | | | |
|---|---|---|---|
| 1538487 | 11/1969 | Fed. Rep. of Germany | 361/42 |
| 250494 | 4/1926 | United Kingdom | 361/42 |

Primary Examiner—Harry E. Moose, Jr.
Attorney, Agent, or Firm—Robert E. Converse, Jr.

[57] ABSTRACT

A system for the emergency deenergization of a multibranch power circuit includes a ground fault circuit interrupter having capability to trip under both ground fault and grounded neutral conditions. A plurality of receptacles are provided on the circuit to receive connecting plugs of electrical devices to be powered. A removable plug adapted for insertion into any of the receptacles includes the series combination of a normally open pushbutton switch and resistor connected between plug pins which are in contact with the neutral and ground conductors of the circuit so that actuation of the switch when the plug is inserted in a receptacle establishes a low-impedance path from neutral to ground which is detected by the ground fault circuit interrupter. This causes the interrupter to trip and deenergize the circuit.

16 Claims, 1 Drawing Figure

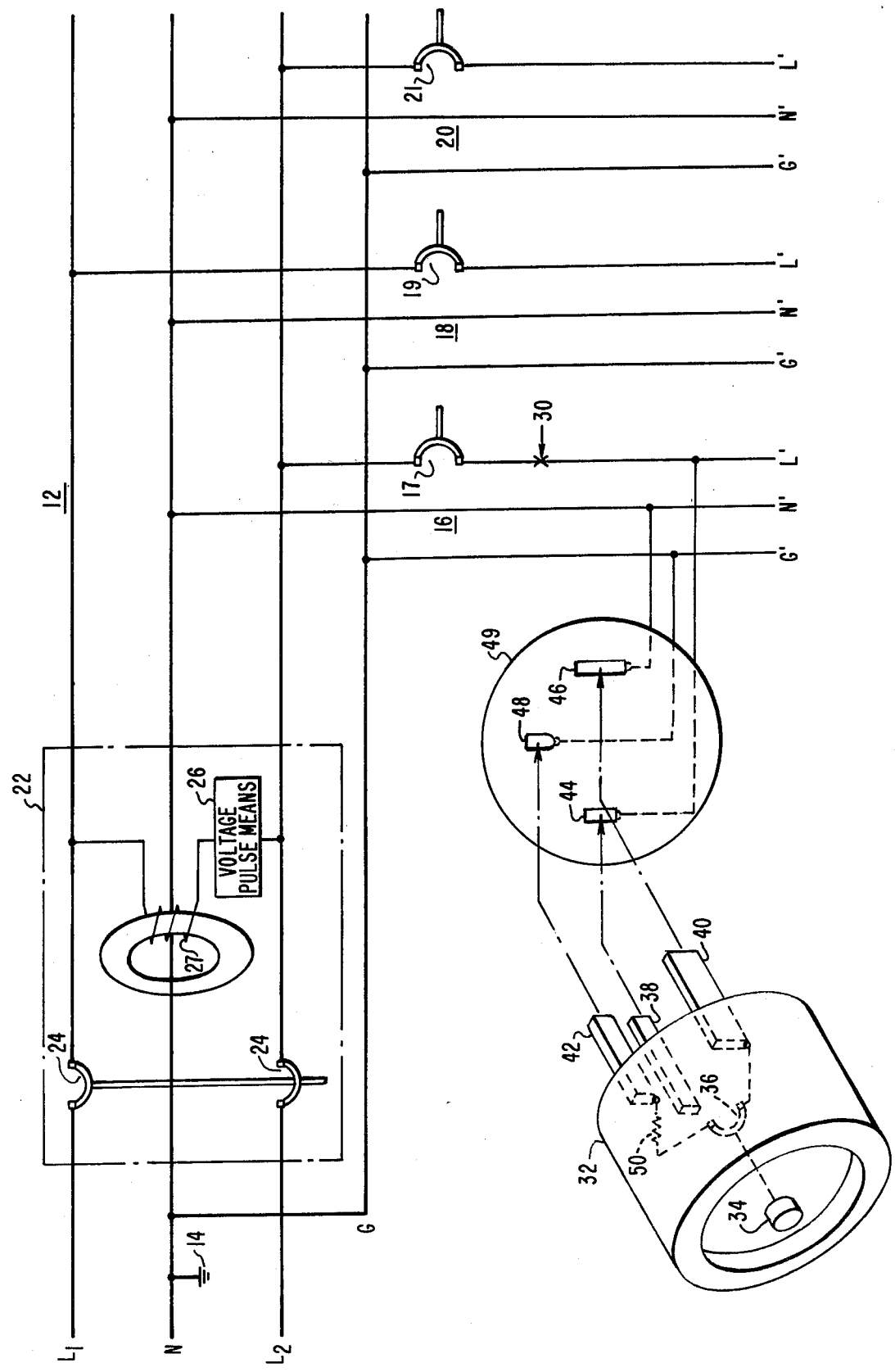

WIRELESS EMERGENCY POWER INTERRUPTING SYSTEM FOR MULTIBRANCH CIRCUITS

CROSS-REFERENCE TO RELATED APPLICATIONS

The present invention is related to material disclosed in copending U.S. patent application Ser. No. 858,990, entitled "Wireless Emergency Power Interrupting System" (W.E. 47,362), filed Dec. 9, 1977 by Joseph C. Engel and Michael A. Tomko.

BACKGROUND OF THE INVENTION

1. Field of the Invention

The invention relates to electrical apparatus and, more particularly, to an emergency system for disconnecting a multibranch electrical power distribution circuit from a source of electrical power.

2. Description of the Prior Art

Emergency electrical power interrupting "panic buttons" are widely used in laboratories, shops, factories, and commercial establishments. Such systems normally consist of large, easily seen red pushbutton switches located in readily accessible places to provide for rapid interruption of electrical power should an emergency occur. In prior art systems, the panic button operates a momentary contact switch which is used to energize the trip coil of a circuit breaker protecting the power distribution circuit. Thus, separate wiring must be provided between the circuit breaker and each location wherein it is desired to place a panic button. The cost and complexity of this additional wiring has often meant that the number of panic buttons installed has been less than would be desirable. In other situations, this cost and complexity has completely ruled out the installation of such an emergency power interruption system.

In most industrial and commercial installations, and in many residential installations, the National Electric Code calls for the inclusion of ground fault protective capability in addition to overload current protection. Such ground fault protective equipment is normally designed to deenergize the associated electrical power distribution network upon detection of ground fault current levels much less than the overload trip levels. For example, many residential ground fault circuit breakers are designed to trip upon detection of 5 milliamperes of ground fault current. In addition, many ground fault circuit breakers include means for tripping the circuit breaker upon detection of a grounded neutral conductor.

It is desirable to provide an emergency power interruption system which does not require wiring other than the power conductors themselves and which uses the sensitive ground fault detection capability and grounded neutral conductor detection capability of ground fault circuit interrupters already existing in many installations. It is also desirable to provide an emergency power interruption system which is operable upon a multibranch power distribution network regardless of whether the branch circuit breakers are open or closed.

SUMMARY OF THE INVENTION

Emergency power interruption apparatus is provided for use on an electrical power distribution system. The apparatus includes a ground fault circuit interrupter adapted to interrupt current flow through an electrical power circuit having phase and neutral conductors upon occurrence of a ground fault current above a predetermined value. The circuit interrupter also includes means for interrupting such current flow if the neutral conductor becomes grounded. The apparatus further includes means located downstream from the ground fault circuit interrupter for deliberately connecting the neutral conductor to ground.

The apparatus is especially suited for use on multiphase multibranch electrical power distribution circuits which include single pole branch circuit interrupters in the phase conductors of branch circuits. In a preferred embodiment, a removable plug is inserted into any of the power system receptacles which are ordinarily used to power electrical apparatus from the circuit. The removable plug includes pins adapted for insertion into the receptacle terminals which are connected to the neutral and ground conductors of the circuit. A switch is connected to the neutral pin and to ground such that closure of the switch connects the branch circuit neutral conductor to ground. When this condition is sensed by the ground fault circuit interrupter, it immediately trips the ground fault circuit breaker to deenergize the entire distribution system. Switching of the neutral conductor to ground is effective to deenergize the system regardless of the status of the branch circuit interrupter.

BRIEF DESCRIPTION OF THE DRAWINGS

The invention may be more readily understood by reference to the following specification and to the drawing which is a diagram, partially schematic and partially pictorial, of an electrical power distribution circuit incorporating the present invention.

DESCRIPTION OF THE PREFERRED EMBODIMENT

Referring now to the drawing, an electrical power distribution circuit 12 is supplied by a power source (not shown) upstream to the left in the drawings. The system 12 includes a pair of main phase conductors $L_1$ and $L_2$, a main neutral conductor N, and a main ground conductor G. The main neutral conductor N is grounded at the point 14, and the main ground conductor G is connected thereto. A plurality of branch circuits 16, 18, and 20 are provided, each having a branch ground conductor G', a branch neutral conductor N', and a branch phase conductor L'. The branch ground conductors G' and branch neutral conductors N' of all branch circuits are connected to the main ground conductor G and main neutral conductor N, respectively. The branch phase conductors L' are connected to either of the main line conductors $L_1$ and $L_2$ through single pole breakers 17, 19, and 21.

A ground fault circuit interrupter 22 is inserted in the circuit 12 upstream from the first branch circuit 16 and downstream from the source and ground connection 14. The ground fault circuit interrupter 22 includes a pair of separable contacts 24 connected in series with the main phase conductors $L_1$ and $L_2$. In a manner well known in the art, current flow is sensed from either of the main line conductors $L_1$ or $L_2$, or any of the phase conductors L' to ground. Upon occurrence of ground fault current above a predetermined level, the contacts 24 are separated to deenergize the portion of the circuit 12 which is downstream from the ground fault circuit interrupter 22.

The ground fault circuit interrupter 22 also includes means 26 for estabishing a train of voltage pulses upon the main neutral conductor N through an exciting transformer 27. If a low impedance path between the main neutral conductor N and ground is formed downstream from the ground fault circuit interrupter 22, a circuit would thus exist, causing current pulses corresponding to the induced voltage pulses to flow in the neutral conductor N. The circuit interrupter 22 includes means for detecting these current pulses and immediately separating the contacts 24 to deenergize the circuit 12. This type of grounded neutral protection is often provided to increase the safety and reliability of the ground fault circuit interrupter 22, for although a grounded neutral conductor in and of itself does not present a hazard, it can reduce the sensitivity of the ground fault circuit interrupter 22 to ground fault currents. A more complete description of a ground fault circuit interrupter incorporating various types of grounded neutral protection may be found in U.S. Pat. No. 3,959,693, issued May 25, 1976, to Coley and Misencik, and U.S. Pat. No. 3,611,035 to Douglas.

In the aforementioned U.S. Patent Application Ser. No. 858,990 (W.E. 47,362) an emergency power system is described which provides a number of advantages. This system operates by deliberately inducing a flow of ground fault current from the phase conductor to ground in order to cause the ground fault circuit interrupter to trip. However, such a method is not suitable for use with multibranch electrical power distribution circuits such as the circuit 12. For example, if the branch breaker 17 were open, connecting the branch line conductor L' to the branch ground conductor G' at the point 30 would be ineffective in causing ground current to flow, and the system 12 would not be deenergized by the breaker 22.

In the present invention, emergency power interruption is provided for multibranch circuits by providing means for deliberately connecting the branch neutral conductor N' to ground. This allows the neutral conductor voltage pulses to produce a flow of current pulses in the neutral line N, causing the circuit interrupter 22 to trip and deenergize the circuit 12. In a preferred embodiment of the invenion, a plug 32 which is externally identical to the plugs of the power cords of electrical apparatus being supplied by the circuit 12, is modified to include a pushbutton switch 34 having contacts 36. The plug 32 also includes pins 38, 40, 42 cooperating with corresponding terminals 44, 46, 48 to make electrical contact with the branch conductors L', N' and G', respectively. The contacts 36 of the switch 34 may be connected in series with a low value resistor 50 of, for example, one ohm. This resistor, while not necessary for the operation of the invention, limits the flow of current through the contacts 36 if the switch 34 is actuated while the branch circuit is heavily loaded. This allows the use of inexpensive low current rating contacts 36. Other types of impedance devices such as a coil or capacitor could also be used to limit the flow of current.

As can be seen, actuation of the switch 34 will thus provide an electrical connection between the pin 40 and 42. When the plug 32 is inserted into the receptacle 49, actuation of the switch 34 will thus allow current to flow from the conductor N' through the terminal 46, the pin 40, the contacts 36, the resistor 50, the pin 42, and the terminal 48 to the conductor G'. Voltage pulses produced by the device 26 on the main neutral conductor N will thus produce corresponding current pulses therethrough which will be detected by the ground fault circuit breaker 22. Thus, whenever the pushbutton 34 is actuated, circuit breaker 22 will trip, thereby deenergizing the circuit 12 and isolating that portion of the circuit 12 downstream from the circuit breaker 22 from the electrical power source.

By installing the means for connecting the neutral and ground conductors in the plug 32, a variety of advantages is obtained. The plug can be placed in any or all of the receptacles 49 upon the circuit 12. The cost of each plug 20 is much lower than the cost of providing prior art emergency power interrupting buttons requiring separate wiring to a circuit breaker trip coil. In addition, if a temporary remote panic button is required, it can be provided in a simple convenient manner through the use of a standard extension cord plugged into a receptacle 14 and a plug 32 inserted into the other end of the extension cord. The plug 32 then can be moved to wherever emergency power interruption capability is required. Furthermore, a single plug 20 can be carried by an operator to any desired location having a receptacle 49. By connecting the neutral conductor to ground in order to trip the ground fault circuit breaker, emergency power interruption capability can be provided on a multibranch electrical power distribution system without regard to the status of the branch circuit breakers.

Although many advantages are provided by the use of a switch in a power plug to cause the desired connection of the neutral conductor to ground, other arrangements may be desirable to serve certain applications. In each case however, the emergency power interruption capability is provided by deliberately establishing a low-impedance path between the neutral conductor and ground.

It can be seen, therefore, that the present invention provides an emergency interruption system which can be installed with extremely low cost upon existing electrical power distribution circuits having ground fault and grounded neutral protection capability. Furthermore, the present invention provides a highly flexible and convenient means of providing emergency power interruption capability upon multibranch circuits at a wide variety of locations.

What is claimed is:

1. Apparatus for providing emergency power interruption on a multibranch electrical power distribution system having a main phase conductor and a main neutral conductor grounded upstream from the branch circuits, a plurality of branch circuit interrupters connected in the phase conductor of the branch circuits, and a plurality of receptacles for receiving power plugs of electrical equipment to be powered by the circuit, said apparatus comprising:

a main circuit interrupter connected in the electrical power distribution system downstream from the grounding point of the main neutral conductor, said main circuit interrupter comprising means for deenergizing the electrical power distribution system if the neutral conductor of the system becomes grounded through a low-impedance path; and means located downstream from said main circuit interrupter for deliberately providing a low-impedance path between said neutral conductor and ground, said means comprising a multi-pin plug adapted for insertion into any of the receptacles and comprising a switch disposed in said plug, said switch being connected to pins in contact with the neutral conductor and ground, whereby actuation of said switch is operable to establish a low impedance neutral-to-ground path and cause said main circuit interrupter to deenergize the system.

2. A safety device for deenergizing an associated electrical power circuit under emergency conditions, the circuit having a phase conductor, a neutral conductor, a ground conductor, and a plurality of receptacles for receiving power plugs of electrical apparatus to be powered by the circuit; the circuit being protected by a circuit breaker having a capability to trip upon detection of a low-impedance path from the neutral conductor to ground; said device comprising:

a multi-pin plug adapted for insertion into any of the receptacles, whereby each pin comes in electrical contact with one of the conductors; and a switch disposed in said plug and electrically connected between those pins of said plug which are in electrical contact with the neutral conductor and the ground conductor, whereby a low-impedance path is established between the neutral conductor and ground to cause the circuit breaker to trip when said switch is closed.

3. A device as claimed in claim 2 comprising impedance means connected in series circuit relationship with said switch.

4. A device as recited in claim 3 wherein said impedance means comprises a resistor.

5. A device as recited in claim 2 wherein said switch comprises a normally open momentary contact switch.

6. A device as recited in claim 5 comprising impedance means connected in series circuit relationship with said switch.

7. A device as recited in claim 6 wherein said impedance means comprises a resistor.

8. An emergency power interruption apparatus for use on an electrical power distribution system comprising:

a main circuit interrupter adapted to interrupt current flow through an electrical power circuit having phase, neutral, and ground conductors, said circuit interrupter comprising means for interrupting current flow if said neutral conductor becomes grounded downstream from said ground fault circuit interrupter through a low-impedance path;

a multiple terminal receptacle adapted to receive power plugs of electrical equipment to be powered by the circuit and having one terminal connected to each of said phase, neutral, and ground conductors; and, connecting means located downstream from said main circuit interrupter for deliberately establishing a low-impedance path from said neutral conductor to ground;

said connecting means comprising a removable plug inserted into said receptacle and comprising a housing, a first pin connected to said receptacle neutral terminal, a second pin connected to said receptacle ground terminal, and a switch mounted in said housing and connected between said first and second pins.

9. Apparatus as recited in claim 8, wherein:
said plug comprises an impedance means connected in series circuit relationship with said switch.

10. Apparatus as recited in claim 9, wherein said impedance means comprises a resistor.

11. Apparatus as recited in claim 8, wherein:
said switch comprises a normally open momentary contact switch.

12. Apparatus as recited in claim 8, wherein:
said plug comprises a pin configuration identical to the power plugs of electrical devices being powered by the electrical circuit.

13. Apparatus as recited in claim 8 for use on a multiphase electrical power distribution system, wherein:
said main circuit interrupter comprises a multipole interrupter with one pole being connected in each phase conductor of the multiphase electrical power distribution system being protected.

14. Apparatus as recited in claim 8, wherein:
the neutral conductor of the system being protected is grounded upstream from said main circuit interrupter and said main circuit interrupter comprises means for inducing a train of voltage pulses on said neutral conductor; and, said apparatus comprises means for detecting current pulses in said neutral conductor corresponding to said voltage pulses and means for interrupting current flow on said system upon detection of said current pulses, whereby said system is deenergized whenever said neutral conductor becomes grounded through a low-impedance path.

15. A method of emergency power interruption upon an electrical circuit having a phase conductor and a neutral conductor, said neutral conductor being permanently grounded at a single point, said method comprising the steps of:

providing a circuit interrupter having main contacts connected in series with the phase conductor at a point downstream from the neutral conductor grounding point, said circuit interrupter comprising tripping means for opening said main contacts upon occurrence of a low-impedance path from the neutral conductor to ground at a point downstream from said circuit interrupter; and deliberately establishing a low-impedance path from the neutral conductor to ground at a point downstream from said circuit interrupter, whereby said circuit interrupter trips to open said main contacts and de-energize that portion of the circuit downstream from said circuit interrupter.

16. A method as recited in claim 15 wherein said low impedance path is established by closing switch contacts connected in series with the neutral and ground pins of a power plug inserted into a standard power receptacle connected to the circuit.

* * * * *